United States Patent [19]

Myles

[11] Patent Number: 5,456,787
[45] Date of Patent: Oct. 10, 1995

[54] METHOD FOR MAKING A HYDROPNEUMATIC ACCUMULATOR

[75] Inventor: J. Edgar Myles, West Bloomfield, Mich.

[73] Assignee: J. E. Miles, Inc., Troy, Mich.

[21] Appl. No.: 159,715

[22] Filed: Dec. 1, 1993

[51] Int. Cl.$^6$ ............................ B29C 69/00; B29C 49/20
[52] U.S. Cl. .................. 156/321; 29/458; 138/30; 264/83; 264/516; 264/249; 264/331.19
[58] Field of Search ............ 264/83, 516, 552, 264/544, 513, 331.13, 331.19, 328.8, 340, 249; 138/30; 156/321; 29/890.06, 458

[56] References Cited

U.S. PATENT DOCUMENTS

| | | | |
|---|---|---|---|
| 3,560,166 | 2/1971 | Walles | 264/340 |
| 3,874,052 | 4/1975 | Schantz | 264/516 |
| 3,947,539 | 3/1976 | Lane | 264/83 |
| 4,875,706 | 10/1989 | Joseph et al. | 280/708 |
| 4,885,121 | 12/1989 | Patel | 264/328.8 |
| 5,030,399 | 7/1991 | Walles et al. | 264/83 |
| 5,036,110 | 7/1991 | Moureaux . | |
| 5,156,783 | 10/1992 | Seizert et al. | 264/83 |
| 5,202,161 | 4/1993 | Seizert et al. | 264/83 |

FOREIGN PATENT DOCUMENTS

| | | | |
|---|---|---|---|
| 57-156235 | 9/1982 | Japan | 264/83 |
| 02129A | 2/1993 | WIPO | 264/83 |

OTHER PUBLICATIONS

"Plastics World" magazine, Feb. 1992.

Primary Examiner—Jeffery R. Thurlow
Attorney, Agent, or Firm—Alex Rhodes

[57] ABSTRACT

A method for making a hydropneumatic accumulator with a replaceable bladder for an active vehicle suspension comprising the steps chemically treating a resilient single layer bladder with a gas to provide imperviousness of a compressible gas through the bladder, bonding a spherical bumper to a closed end of the bladder, engaging an inward facing seal portion extending around an "open mouth" portion of the bladder with an external groove extending around a cylindrical cap to close off the "open mouth" portion, slideably mounting the cap and said bladder in the interior of an accumulator housing to divide the housing into a first sealed chamber for a hydraulic liquid and a second sealed chamber for a compressible gas; and engaging a detachable ring with a groove in the interior of the accumulator housing to retain the cover and the bladder in the housing.

7 Claims, 2 Drawing Sheets

METHOD FOR MAKING A HYDROPNEUMATIC ACCUMULATOR

FIELD OF THE INVENTION

This invention relates to bladder type accumulators and more particularly to a hydropneumatic accumulator with a polyurethane bladder for motor vehicle suspensions.

BACKGROUND OF THE INVENTION

Hydropneumatic accumulators for motor vehicles are primarily geared toward air spring applications in half band, full band and level control suspension systems. An air spring can be used as an energy storage device, pulsation dampener, or shock transient absorption device in such systems.

Recently, a demand has developed for accumulators for active vehicle suspension systems which provide vehicle handling control safety; and, improve comfort and vehicle handling. Comfort and handling are improved by providing a level ride on irregular road surfaces and during braking, cornering, speed changes and lane changes. Active suspensions are also effective in countering the aerodynamic forces of winds and large highway trucks.

Vehicle attitude changes are undesirable because they produce wheel caster and chamber changes which cause undesirable steering effects and increase tire wear. Active suspensions are beneficial for passenger vehicles, trucks, construction equipment, as well as military vehicles, such as army personnel carriers which often operate on irregular terrain.

Heretofore, suspension accumulators have incorporated closed mouth bladders made of natural and synthetic rubber materials, such as Nitrile, Butyl, Viton and Neoprene. One problem with current accumulators is that bladders develop leaks during severe and extended service.

Bladder leaks can occur from fatigue or from bladder contact with a port assembly. Leaks adversely affect vehicle ride handling and safety and increase the cost of vehicle ownership. Leaks are also undesirable because they adversely affect the reputation of an automobile's manufacturer.

Polyurethane materials are higher in strength than the aforedescribed synthetic rubber materials. Moureaux, U.S. Pat. No. 5,036,110 discloses a bladder for a hydropneumatic accumulator having a laminated bladder made from laminating layers of polyurethane to opposite sides of a layer formed by the reaction of polyurethane with a copolymer of ethylene and vinyl alcohol.

Laminated bladders are undesirable because of high costs, low production rates, quality control problems and failures due to layer separation.

SUMMARY OF THE INVENTION

The present invention is directed to an improved hydropneumatic accumulator for active vehicle suspension systems.

The invention resides in individual features which make the accumulator suitable for severe and extended service in motor vehicles as the process for making the same. One feature of the invention is that the bladder is molded from a single piece of high strength polyurethane or other high strength polymer material.

Another feature is that the bladder may be chemically treated after molding to reduce the likelihood of leakage of a gas precharge through the bladder.

Another feature of the invention is that a bumper is provided at an extensible end of the bladder to protect the bladder during contact with a port assembly.

Another feature of the invention is that the bladder can be readily replaced in service.

The accumulator is comprised of a generally cylindrical housing, a detachable cover slideably mounted in the housing and a bladder suspended in the interior of the housing which divides the accumulator into a compressible gas filled portion and a hydraulic fluid filled portion. In the housing there is a port for admitting and discharging hydraulic fluid from one end of the accumulator. In the cover there is a second port for admitting and discharging a compressible gas from an opposite end of the accumulator.

Further features and benefits of my invention, will be apparent from the ensuing detailed description taken in conjunction with the accompanying drawings. The best mode which is contemplated in practicing my invention is disclosed and the subject matter in which exclusive property rights are claimed is set forth in each of the numbered claims which are appended to the detailed description.

DETAILED DESCRIPTION OF THE PREFERRED EMBODIMENT

Figure 5:
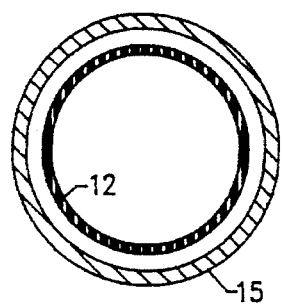
FIG. 5 is a cross-sectional view taken on the line 5—5 of FIG. 4.
Figure 1:
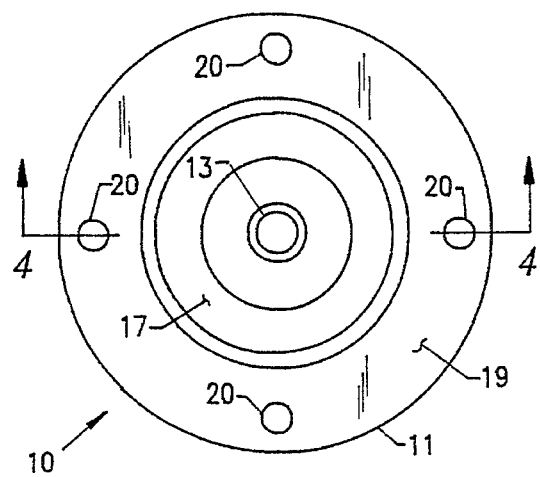
FIG. 1 is a typical plan view of an accumulator according to the invention.

Referring now to the drawings wherein like numerals designate like and corresponding parts throughout the several views, a hydropneumatic accumulator generally designated by the numeral 10 is shown according to the invention. Although the illustrated accumulator 10 is particularly adapted for an active vehicle suspension, it is not my intention to restrict my invention in this manner since it can also be adapted for use in industrial machinery, airplanes, ships, and the like.

The accumulator 10 is a generally cylindrical assembly comprised of a housing 11 and extensible bladder 12 mounted in the interior of the housing 11. At one end of the housing 11 there is a port 13 or a conventional valve (not shown) for allowing compressible gas flow in and out of the accumulator 10 and at an opposite end there is a port 14 for allowing hydraulic fluid flow in and out of the accumulator 10.

The housing 11 is comprised of a tubular body 15, a base 16, a top cover 17 and a retaining ring 18. The top cover 17 and retaining ring 18 retain the bladder 12 and contain the hydraulic pressure. The tubular body 15 is sealingly fixed to the base 16 by welding, brazing, or another conventional means. The tubular body 15 and base 16 may also be formed from a one piece machined forging, machined casting, or molded plastic part.

The compressible gas port 13 is located in the center of the top cover 17 and the hydraulic fluid port 14 in the center of the bottom base 16. A flange 19 extends outwardly on the base 16 and has a pair of apertures for mounting the accumulator 10 to a vehicle (not shown) and operatively connecting the accumulator 10 to a hydraulic system. In the alternative, the accumulator 10 may be connected to a hydraulic system via a conventional threaded port (not shown) attached to the center of the base.

One feature of the bladder 12 is that it is a one piece design which is injection or blow molded of polyurethane or other high strength polymer material. By injection or blow molding the bladder 12 with a material such as BASF polyurethane (TPU) Elastollan Series C-C78a, bladder strength is substantially increased over bladders made from the previously described conventional materials. Also, injection or blow molding results in closer dimensional tolerances, improved integrity and lower cost.

After the bladder 12 is molded, it may be chemically treated by sulfonation to reduce a likelihood of leakage. Although chemical treatments, such as, fluoridation and sulfonation, have been used to reduce leakage through rigid high density polyethylene parts, by way of example, rigid high density polyethylene automotive fuel tanks (See February, 1992 issue, "Plastics World" magazine) Applicant is unaware of a chemically treated extensible bladder in the prior art.

Figure 4:
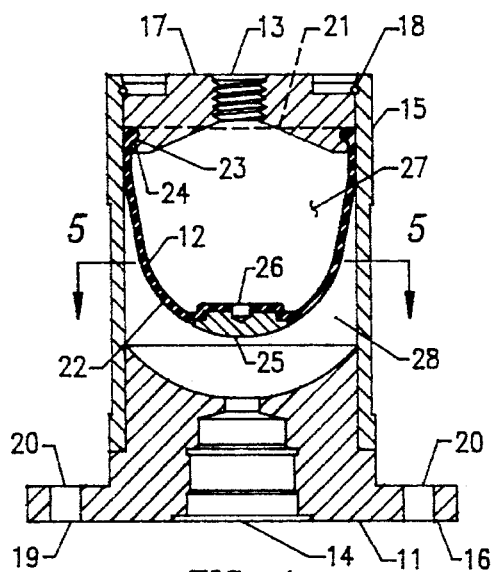
FIG. 4 is a cross-sectional view taken on the line 4—4 of FIG. 1.
Figure 2:
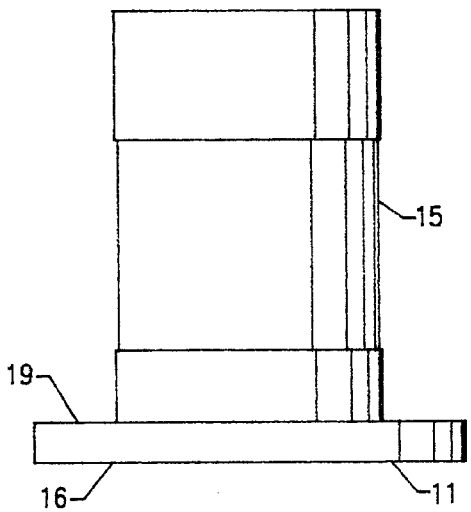
FIG. 2 is a side view of the accumulator shown in FIG. 1.

The construction of the bladder 12 is best understood by reference to FIG. 4. The bladder 12 which is concentric with the housing 11 is a generally cylindrical part having an "open mouth" end portion 21 and an opposite closed end portion 22. The open mouth portion 21 has an inward facing arcuate rim portion 23 which is held in an annular groove 24 on the periphery of the cover 17.

The inward facing rim portion 23 is a feature of the present invention. It provides an effective seal for separating a hydraulic fluid on the outside of the bladder 12 from a compressible gas inside of the bladder. It also cooperates with the retaining ring 18 whereby the bladder 12 may be readily replaced in service.

The closed end portion 22 of the bladder 12 is free to move axially in the housing 11 when the bladder is extended by an increase of gas pressure or decrease of fluid pressure in the accumulator 10. The closed end 22 of bladder 12 is protected from damage during contact with port 14 by a hardened spherical steel bumper 25. The spherical bumper 25 is adhesively bonded or molded to the closed end 22 of bladder 12 during the injection or blow molding of the bladder 12. In the preferred method of attachment, an adhesive is applied to the steel bumper 25 prior to inserting the bumper 25 into the mold (not shown) which is used for injection or blow molding the bladder 12. In the upper portion of the bumper 25 there is a blind manufacturing hole 26 for locating the bumper 25 in the mold.

The bladder 12 divides the accumulator 10 into two chambers, a compressible gas filled chamber 27 and a hydraulic fluid filled chamber 28. The gas filled chamber 27 is bounded by the interior of the bladder 12 and the top cover 17. The fluid filled chamber 28 consists of the space between the exterior of the bladder 12 and cylindrical housing 11.

As shown in FIG. 4, the port 13 in the center of the top cover 17 permits a compressible gas to flow in and out of the gas filled chamber 27 and the port 14 in the center of the bottom base 16 permits a hydraulic fluid to flow in and out of the fluid filled chamber 28.

Figure 6:
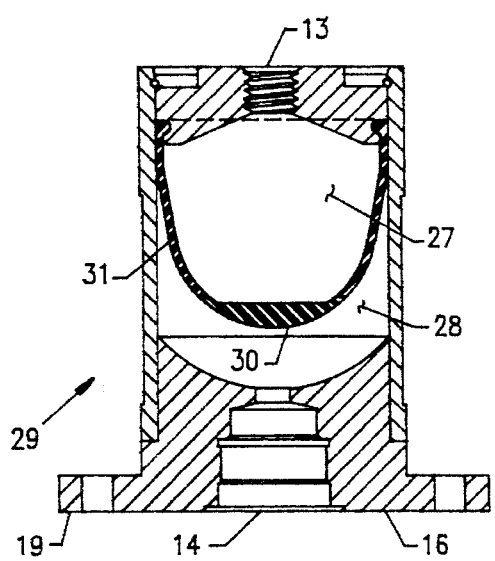
FIG. 6 is an alternate embodiment of the invention taken in the same manner as FIG. 4.
Figure 3:
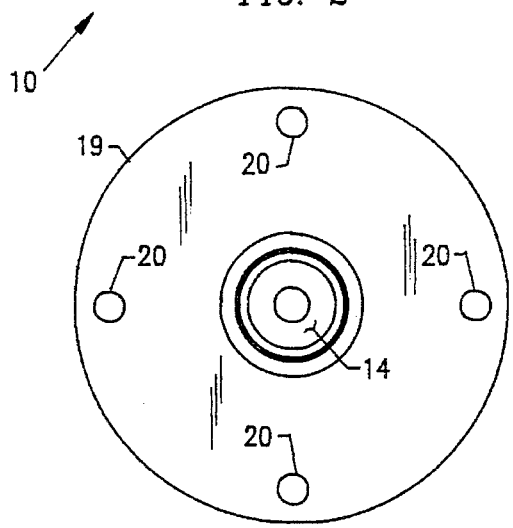
FIG. 3 is a bottom view of the accumulator shown in FIG. 1
Figure 7:
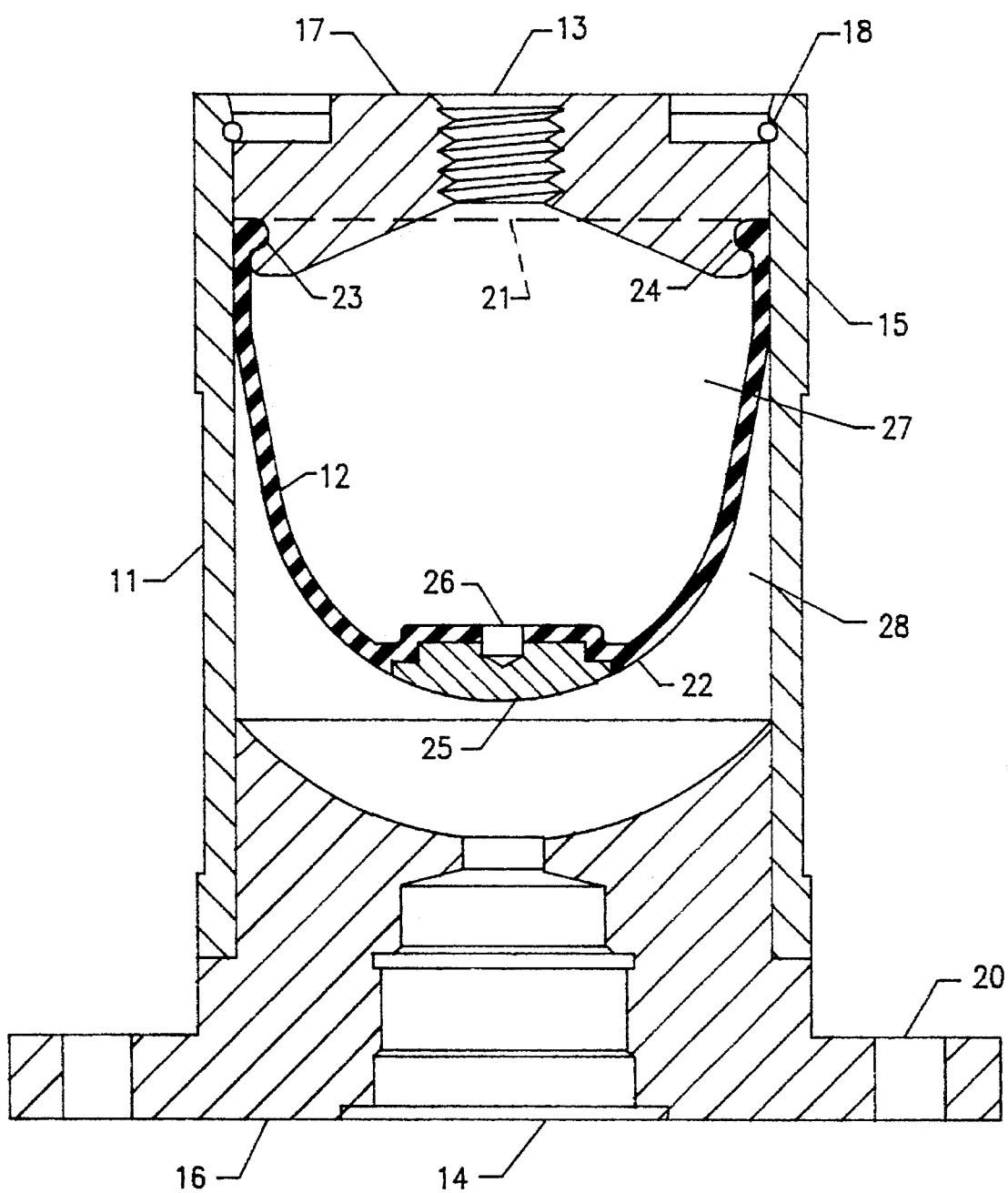
FIG. 7 is an enlarged view of FIG. 4.

Referring now to FIG. 6, an alternate embodiment 29 is shown wherein the steel spherical bumper is eliminated by injecting a high durometer, preferably about 90–100 Shore A, polyurethane material into the mold to form an integral high strength end portion 30 during the injection of a lower 78A durometer polyurethane for the major remaining portion 31 of the bladder 32.

From the foregoing, it will be understood that my invention provides a maintenance free accumulator and method for making the same which are particularly adapted for meeting the severe demands of active vehicle suspension systems.

Although but two embodiments of my invention have been illustrated and described it will be appreciated that other embodiments can be developed without departing from the spirit thereof.

I claim:

1. A method for making a hydropneumatic accumulator with a replaceable resilient bladder for a vehicle suspension, comprising the steps of engaging an inward facing seal portion extending around an "open mouth" portion of a single layer bladder having an opposite closed end portion with an external groove extending around a cylindrical cap to close off said "open mouth" portion of said bladder; slideably mounting said cap and said bladder in the interior of an accumulator housing to suspend said bladder in said housing and divide said housing into a first sealed chamber for a hydraulic liquid and a second sealed chamber for a compressible gas; and engaging a detachable ring with groove in the interior of said accumulator housing to retain said cap and said bladder in said housing.

2. The method for making an accumulator as recited in claim 1 further comprising the step of chemically treating said bladder by exposing said single layer bladder to a mixture of sulfur trioxide gas in air prior to assembling said bladder in said housing to produce a thin layer of a sulfonate on an external portion of said bladder to provide imperviousness of said compressible gas through said bladder.

3. The method as recited in claim 2, further comprising the step of treating said bladder after sulfonation with a neutralizing agent to make the resulting sulfonate inert.

4. The method as recited in claim 3 wherein said neutralizing agent is comprised of an inorganic calcium solution.

5. The method for making an accumulator as recited in claim 1 further comprising the step of bonding a spherical bumper to said closed end of said bladder before assembling said bladder in said housing to improve the durability of said bladder.

6. The method for making an accumulator as recited in claim 5 further comprising the step of coating a surface of said spherical bumper with an adhesive for bonding of said bumper to said bladder.

7. A method for making a hydropneumatic accumulator with a replaceable resilient bladder for a vehicle suspension, comprising the steps of bonding a spherical bumper to a closed end of a single layer bladder having an opposite "open mouth" end; chemically treating said bladder with a gas to provide imperviousness of a compressible gas through said bladder; treating said bladder with a neutralizing agent; engaging an inward facing seal portion extending around an "open mouth" portion of said bladder having an opposite closed end portion with an external groove extending around a cylindrical cap to close off said "open mouth" portion of said bladder; slideably mounting said cap and said bladder in the interior of an accumulator housing to suspend said bladder in said housing and divide said housing into a first sealed chamber for a hydraulic liquid and a second sealed chamber for a compressible gas; and engaging a detachable ring with a groove in the interior of said accumulator housing to retain said cap and said bladder in said housing.

* * * * *

UNITED STATES PATENT AND TRADEMARK OFFICE
CERTIFICATE OF CORRECTION

PATENT NO. : 5,456,787
DATED : October 10, 1995
INVENTOR(S) : J. Edgar Myles

It is certified that error appears in the above-indentified patent and that said Letters Patent is hereby corrected as shown below:

On the title page, item [73] Assignee should read--

"J. E. Miles, Inc." to --J. E. Myles, Inc.--

Signed and Sealed this

Thirtieth Day of January, 1996

Attest:

BRUCE LEHMAN

*Attesting Officer*    *Commissioner of Patents and Trademarks*